United States Patent
Nathan et al.

[11] 3,908,190
[45] Sept. 23, 1975

[54] ANALOG TO LOGICAL SYSTEM FOR RANGE MEASUREMENTS INCORPORATING A RADAR

[75] Inventors: Guy E. Nathan, Issy-les-Moulineaux; Claude A. Varaud, Nogent-sur-Marne, both of France

[73] Assignee: Constructions Navales et Industrielles de la Mediterranee C.N.I.M., Paris, France

[22] Filed: Feb. 9, 1973

[21] Appl. No.: 331,297

[30] Foreign Application Priority Data
Feb. 10, 1972 France .......................... 72.04536

[52] U.S. Cl. ............ 343/12 R; 343/5 DP; 343/7 PF
[51] Int. Cl.² .......................................... G01S 9/37
[58] Field of Search .................. 343/5 DP, 12, 7 PF

[56] References Cited
UNITED STATES PATENTS

| | | | |
|---|---|---|---|
| 2,151,323 | 3/1939 | Hollmann | 343/12 R |
| 3,298,024 | 1/1967 | Bohm | 343/12 R |
| 3,714,648 | 1/1973 | Bennett et al. | 343/5 DP |
| 3,730,628 | 5/1973 | Wolcott et al. | 343/12 R X |
| 3,743,419 | 7/1973 | Skagerlund | 343/5 DP X |

*Primary Examiner*—Malcolm F. Hubler
*Attorney, Agent, or Firm*—Finnegan, Henderson, Farabow & Garrett

[57] ABSTRACT

A range-finding proximity detector wherein the Doppler or standing wave radar feeds two threshold flip-flops which are tripped for predetermined different triggering threshold voltage values so as to respectively start and stop the operation of at least one counter during which period it counts the shaped pulses produced by a trigger in accordance with the voltage passing out of the radar and provides a range indication in terms of half wave lengths counted. Calculating means record the figure given out by the counter and provide for comparison of a function thereof with a function of the voltage passing out the radar through the trigger so as to finally, give out the actual desired range.

4 Claims, 4 Drawing Figures

ANALOG TO LOGICAL SYSTEM FOR RANGE MEASUREMENTS INCORPORATING A RADAR

Our invention has for its object to ascertain the range between a reflecting target and a continuously emitting radar. For ascertaining such a range, one resorts generally to a radar producing pulses of successive wave trains so as to detect the echo produced by a hindrance or target and to estimate the time elapsed between the two signals. On the other hand, radars are known with which such a time elapse is not made use of and which, consequently, need not operate on successive wave trains and may operate in a continuous manner, this being the case of the so-called Doppler radars, although some of them can operate on pulses and also radars operating with standing waves. In these latter cases, the signal produced by the radar varies with the range according to an alternating law, a complete cycle or alternation being obtained each time said range has varied by one wavelength. Consequently, such radars are highly suitable for the measurement of the speed of a target with reference to the radar, since, in such a case, the measurement consists in measuring the frequency of the signal thus produced. They may also serve for detecting the presence of a target within the range of the radiations or else for ascertaining the distance of the target under analogue conditions, provided the reflecting power of the target is known in a sufficiently accurate manner, which is seldom the case. For this reason, and in spite of their simple character, such continuously emitting radars cannot be used in practice for ascertaining distances.

The object of the invention is to provide an arrangement or system which can allow a radar of the continuously emitting type to be used for ascertaining as predetermined distance with a high degree of accuracy in the general case of continuous relative movement as between the target and the radar respectively.

According to our invention, we extract from the signal produced by the radar, on the one hand, an analogue value corresponding to the envelope of the Doppler signal and, on the other hand, digital data constituted by a succession of pulses corresponding each to one alternation of said signal. The improved arrangement includes two flip-flops of the threshold type controlled by the analogue signal and the release thresholds of which are low and known accurately, connected to pulse meter which starts and stops under the action of the successive releases of the flip-flops, said meter being fed with the pulses of the digital signal and the number counted by the meter being treated by a reckoning logic circuit which either determines the value of the analogue signal or determines the distance between the radar and the target corresponding to the total number of pulses counted. The reckoning circuit defines directly or in combination with a release comparator said distance between the radar and target digitally, the result obtained being in all cases independent of the reflecting power of the target and of its speed.

To make our invention more readily understood, we will now describe two embodiments thereof given by way of mere examples, reference being made to the accompanying drawings wherein.

It will be assumed hereinafter that the distance between the radar and the target varies at a continuously decreasing rate, whether the target moves towards the radar or the radar moves towards the target and the purpose of the range finding proximity detector is to ascertain the accurate moment at which the distance between radar and target is equal to a predetermined accurate value, say 5 meters.

The radar used is of a standing wave type or else, it may be of the Doppler type without this changing the result. Such a radar operates within hyperfrequency ranges between 8 and 18 gigacycles, that is within the X and K U bands. In order to simplify the calculation in the following example, it will be assumed that the frequency is 15 gigacycles corresponding to a 2 cm. wavelength.

It is a well-known fact that the radar receiver supplies a signal constituted by a voltage V which is a function of the range D and is illustrated by the curve 1 (FIG. 1), corresponding to an alternating function which decreases for increasing distances. On the other hand, it is a well-known fact that the voltage is subjected to a complete alternation each time the distance varies by one wavelength, i.e. 2 cm in the example considered. When D decreases, that is if the curve 1 is considered from the right hand side towards the left hand side of FIG. 1, the various points 2 corresponding to a passage of the decreasing voltage through zero, are spaced equally by 2 cm. Obviously, the number of actual oscillations of the curve is considerably higher than that illustrated. In fact, the same result is obtained if one considers the points for which the increasing voltages pass through zero on the curve again considered from the right towards the left.

Figure 1:
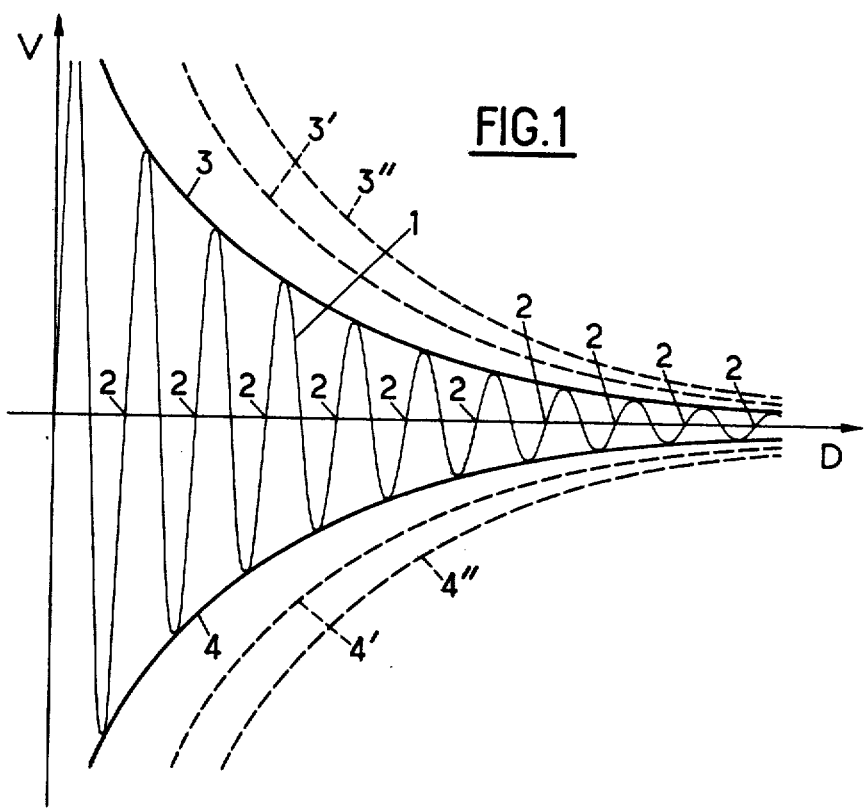
FIG. 1 shows diagrammatically the curve defining the variations in voltage of the signal produced by the radar as a function of the distance between the radar and the target.

On the other hand, the different alternations of the curve 1 pass through successive peaks lying on the envelope curves 3 and 4 (FIG. 1). As well-known and in accordance with the laws of radiation, the variations of the voltage V of the signal received in the radar are inversely proportional to the fourth power of the distance, that is: $V = K/D^4$. The coefficient K depends on the shape, extent, angular position and reflecting power of the target. In practice, it can be admitted that this coefficient is constant for a given target although it may vary to a considerable extent from one target to another. This expression "target" is to cover any hindrance reflecting the waves from the radar, whether a target moving towards the radar, or a stationary hindrance or even the ground towards which the radar moves in the case of a proximity rocket for instance. For targets including ground terrain of different reflecting capacities, the envelopes are different as shown at 3, 4, 3', 4', 3'', 4'' (in FIG. 1). For this reason, at a predetermined moment, the measurement of the variations of the voltage V cannot provide means for ascertaining the distance between the radar and the target since, of course, the value of the coefficient K is generally unknown.

In order to remove this difficulty, we resort to the following novel idea.

Figure 2:
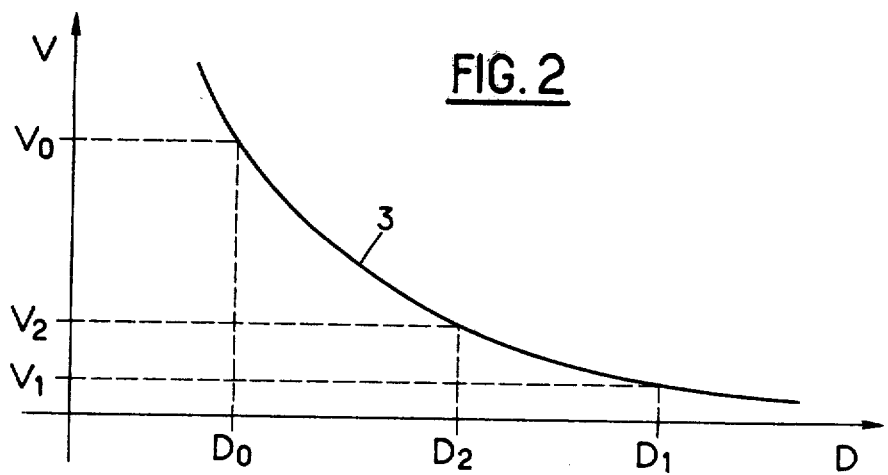
FIG. 2 shows diagrammatically the curve of the peak values of last-mentioned curve.

In the case considered, the signal produced by the radar feeds, after a suitable amplification two threshold flip-flops $B_1$ and $B_2$ (FIG. 3), the former of which becomes operative for a very low voltage $V_1$ near the practical range threshold for which the radar is perceptive while $B_2$ becomes operative for a substantially higher voltage. The envelope 3 drawn in FIG. 2 corresponds to the lowest possible coefficient K to be considered for the targets to be detected by the radar. In the case of a proximity rocket which is to operate at a predetermined distance $D_o$ from the ground, said coefficient corresponds to the lowest reflecting capacity of the ground terrain to be found in Nature. The voltages $V_1$ and $V_2$ are associated with corresponding distances $D_1$ and $D_2$ whereas there corresponds to the distance $D_o$ an unknown voltage $V_o$ and one should of course obtain:

$$V_1 < V_2 < V_o \text{ and } D_o < D_2 < D_1$$

Figure 3:
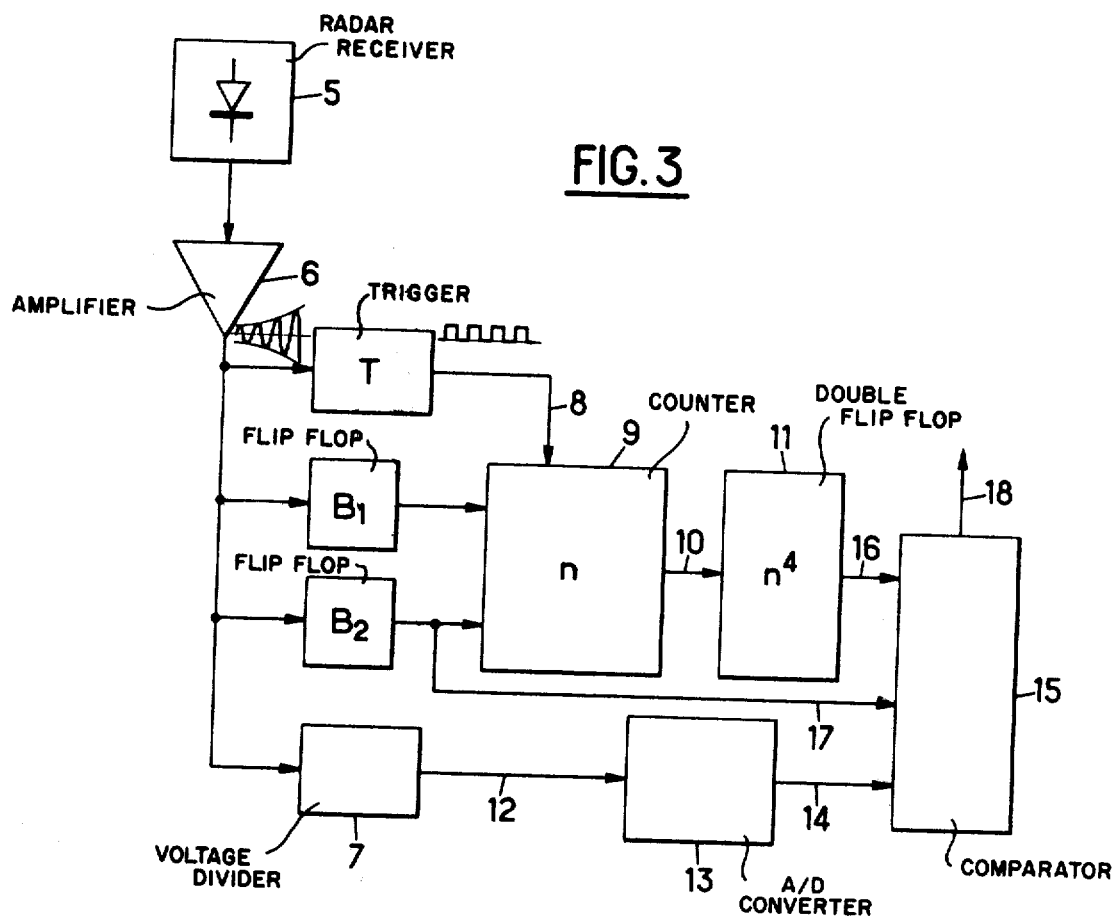
FIGS. 3 and 4 are general diagrammatic views of the first and second embodiments.

The knowledge of $V_1$, $V_2$ and $D_o$ is not always sufficient for ascertaining the values of $D_1$ and $D_2$ nor can $V_o$ be ascertained by the sole knowledge of the analogue variation of the voltage of the envelope 3. It is however possible to obtain the desired result by transmitting the signal produced by the radar in parallel with the flip-flops to the shaping trigger T which outputs a rectangular signal at the same frequency as shown in FIG. 3. In fact, as already disclosed, each further pulse produced by the trigger corresponds to a variation of the distance by one wavelength, that is 2 cm in the case considered.

It is therefore sufficient to count the pulses thus produced between the moment of the starting of the flip-flop $B_1$ and the moment of the starting of the flip-flop $B_2$ in order to obtain the difference between the distances $D_1$ and $D_2$ expressed as a number of wavelengths, that is in centimeters in the case considered. It is then possible to define the unknown values without it being necessary to know the value of K.

As a matter of fact, the voltages being inversely proportional to the fourth power of the distance, as already mentioned one has:

$$\frac{V_2}{V_1} = \left(\frac{D_1}{D_2}\right)^4$$

which shows that the ratio $(D_1/D_2)$ is constant:

$$\frac{D_1}{D_2} = a$$

a being equal to $$\sqrt[4]{\frac{V_2}{V_1}}$$

On the other hand, n being the number of pulses counted between the release of $B_1$ and that of $B_2$ it being understood that the number of pulses n is converted to distance by multiplying it by the wavelength:

$$D_1 - D_2 = n.$$

It is therefore possible to define $D_1$ and $D_2$ since their ratio and difference are known and thus give the value of $V_o$.

Through elimination of $D_2$, there is obtained $$D_1 = \frac{a}{a-1} n.$$

On the other hand through $$V_1 = \frac{K}{D_1^4}$$

there is obtained:

$$K = V_1 D_1^4 = V_1 \frac{a^4}{(a-1)^4} n^4$$

Consequently $$V_o = \frac{K}{D_o^4} = \frac{V_1}{D_o^4} \frac{a^4}{(a-1)^4} n^4$$

or else: $V_o = b\, n^4$ if $$b = \frac{V_1}{D_o^4} \frac{a^4}{(a-1)^4}$$

This produces the value of $V_o$ reached by the difference in voltage V for a distance equal to $D_o$.

This is obtained with the diagram of FIG. 3 wherein the radar 5, for instance of the standing wave type, produces a signal amplified by the amplifier 6 which transmits the signal to the flip-flops $B_1$ and $B_2$ and also to the shaping trigger F and to a voltage divider 7 which is sensitive only to the positive peak values of the signal and divides said signal through the value b which depends, as shown only in $V_1$, $V_2$ and $D_o$. The pulses produced by the trigger T pass through the connecting means 8 into a digital counter 9 which begins counting when released by the flip-flop $B_2$.

The figure n given out by the counter 9 is transmitted through 10 to a multiplier circuit 11 which produces the fourth power of said count n. On the other hand, the voltage V/b produced by the voltage divider 7 is transmitted by the latter through 12 to the analogue to digital converter 13 which transforms this voltage into a digital value corresponding to said value V. This digital value is fed through 14 to a comparator 15 which receives simultaneously through 16 the value $n^4$ produced by the double flip-flop 11. The comparator 15 becomes operative only when the flip-flop $B_2$ has been released, said comparator 15 being responsive to flip-flop $B_2$ through a connection 17. There is thus obtained at 18 a releasing signal as soon as the comparator 15 shows that the condition $V_o/b = n^4$ is met which is to be obtained for instance when firing a missile.

The arrangement thus shown has however the drawback consisting in that it requires an anlogue to digital converter 13 of an intricate structure, which causes a loss in accuracy.

To eliminate this drawback, it is possible to operate exclusively through a digital calculation by resorting no longer to the analogue value of $V_o$ but to the number of pulses N which should be received between the moment of the release of the flip-flop $B_1$ and the final release, while the number $n$ of pulses received between the release of the flip-flop $B_1$ and that of the flip-flop $B_2$ is counted as before.

There is thus obtained:
$D_1 - D_2 = n$
and $D_1 - D_o = N$.

On the other hand, with the preceding symbols the following equality remains true:

$$D_1 = \frac{a}{a-1} n$$

that is:

$$Da = qn \text{ with } q = \frac{a}{a-1}, \text{ while as precedingly}$$

$$a = \sqrt[4]{\frac{V_2}{V_1}}.$$

Now, since $N = D_1 - D_o$, this shows that $N = qn - D_o$. In the example considered, assuming the frequency is equal to 15 Gigacycles (that is a wave-length of 2 cm) and if the distance for which explosion is obtained is equal to 5 m, the distance $D_o$ expressed in wave lengths is equal to 250, so that $N = qn - 250$.

Figure 4:
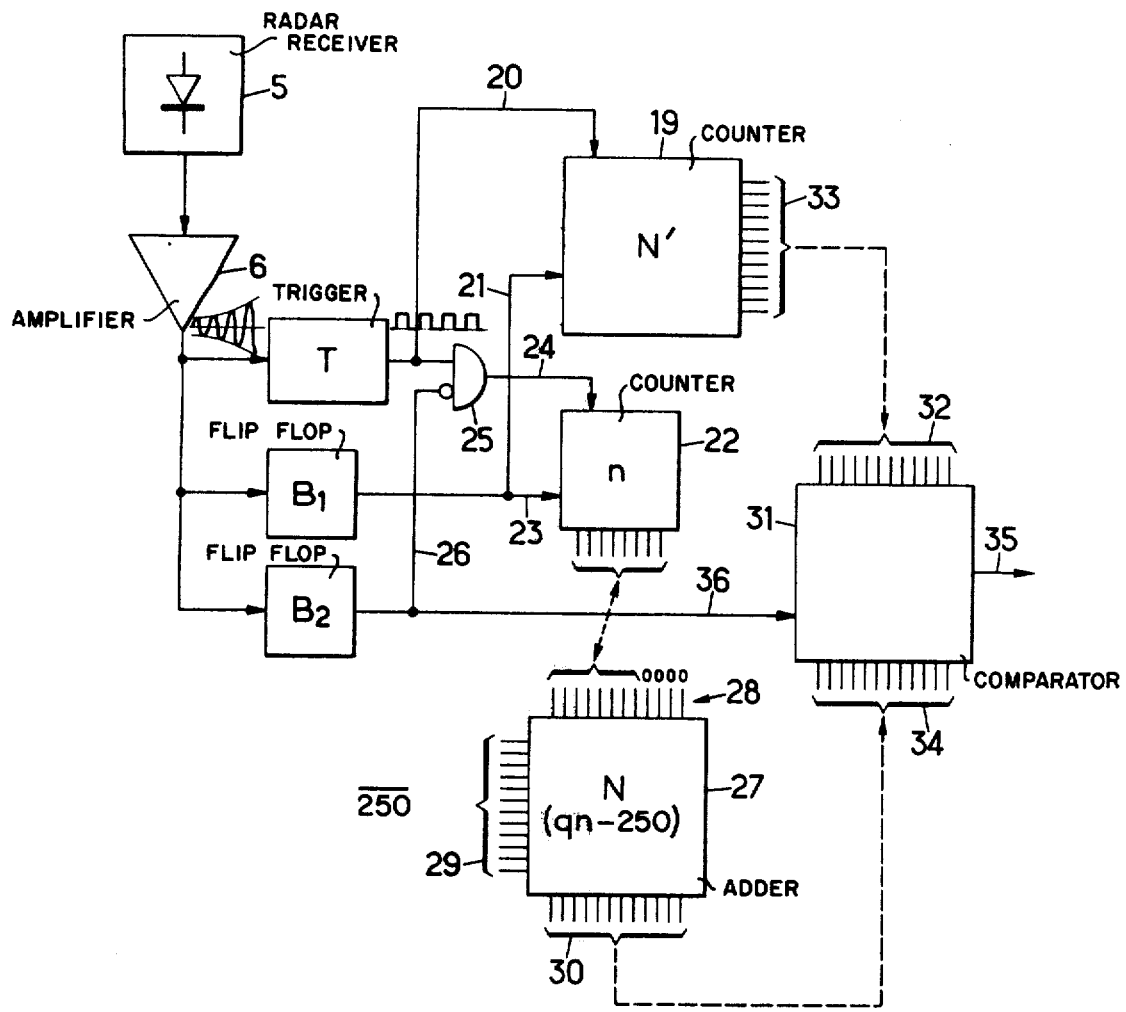

This leads to the embodiment illustrated in FIG. 4 wherein the signal from the radar 5 is amplified as precedingly at 6 and is fed into the shaping trigger T and also to the flip-flops $B_1$ and $B_2$. In the case of FIG. 4, there is provided a first binary twelve-bit counter 19 counting the pulses fed directly from the trigger T through the connection 20, the counting operation being released by the flip-flop $B_1$ through the connection 21. A second binary eight-bit counter 22, for instance, also begins counting upon release of the flip-flop $B_1$ connected with the counter 22 through the connection 23, said counter 22 counting the pulses fed by the trigger T through the connection 24 and the normally open gate 25 which closes under the action of the negative control exercized by the flip-flop $B_2$ through the connection 26. Counter 22 begins counting the pulses as soon as the flip-flop $B_1$ trips and the counting stops when the other flip-flop $B_2$ trips so that the counter 22 produces the number n which remains then unvarying once both flip-flops have tripped. In contradistinction, the first-mentioned counter 19 begins counting as soon as the distance $D_1$ has been reached and it continues producing a number N' which increases as the distance between the target and the radar lessens.

In order to define the figure N to be reached by N' in order to ensure a control of the firing it is necessary to resort to the preceding formula and to first obtain the product $q \times n$. To this end, and with a view to simplification, we select relative values of the voltages $V_1$ and $V_2$ which are known, in a manner such that the coefficient q is a power of 2, such as 16 for instance. It is sufficient therefor for $$a = \sqrt[4]{\frac{16}{15}} = 1.0667$$

and consequently:

$$\frac{V_2}{V_1} = a^4 = 1.294.$$

Thus the multiplication of a binary figure by a power of 2 corresponds to the addition of a number of zeros in the present case of four zeros. Assuming that in FIG. 4, the different bits are recorded from right to left in the order of increasing weights, it is sufficient to transfer the eight bits of the counter 22 onto the eight left hand bits of a 12-bit adder 27, the four bits remaining to the right being replaced by zeros as illustrated at 28 in FIG. 4, so as to obtain thereby the product $nq$. At the same time, the other inputs 29 of the adder member 27 show permanently the complement expressed in the binary system of the figure 250 (that is (111100000100). The adder 27 produces thus the value of $nq - 250$, that is N which appears as a binary output at the outputs 30.

It is therefore sufficient to connect a twelve-bit comparator 31 operating by successive bits through its twelve inputs 32 with the twelve outputs 33 of the counter 19 and through its twelve inputs 34 with the twelve outputs 30 of the adder 27, so as to obtain at the output 35 the releasing signal whenever the bits coincide on each of the 12 comparing levels. The comparator is however released for operation through the connection 36 from flip-flop $B_2$ only when the latter is released, as in the preceding example, so that the value of $n$ may be accurately and finally reckoned.

The execution of the proximity detector according to FIG. 4 is thus simpler since it resorts only to reckoning data of the standard binary type and it is furthermore much more accurate since it operates according to an entirely logical procedure starting from the two flip-flops $B_1$ and $B_2$.

If, instead of a proximity releasing system, it is desired to produce a radar to determine according to a digital procedure the range D of a target, for instance for indicating its value or for feeding it to a reckoning apparatus, it is possible to make use of the preceding results with a substitution of the variable value D as the value sought instead of the constant value $D_o$.

In all cases, there is obtained a comparatively accurate value of the distance through the use of simple and inexpensive electronic components of no high accuracy, even for the radar and, more particularly when a standing wave radar is used. This allows finally for the operation for instance of a comparatively accurate proximity release system which is also very simple, light and inexpensive.

Obviously, the above embodiments have been described by way of examples and do not limit the scope of the invention as defined by the accompanying claims.

What we claim is:

1. An analogue to digital system for detecting the range of a target at some predetermined distance for use with a continuously emitting radar, comprising:
   first and second flip-flops connected to the receiver of said radar, each being responsive to a different voltage level of the signal received by said radar receiver; said first and second flip-flops having known low triggering voltage thresholds;

pulse counting means operative to start a count responsive to the output of said first flip-flop and to stop said count responsive to the output of said second flip-flop;

trigger means connected to said radar receiver for transforming the pulses of said signal into shaped pulses for input into said counting means; and reckoning logic circuit means including means connected to said radar receiver and responsive to said received signal for producing a signal corresponding to the range of said target, said reckoning logic circuit means being responsive to the final output count of said counting means to operate on and compare said final output count of said counting means and said signal corresponding to the range of said target to provide an indication when the distance between said radar and said target corresponds to said predetermined distance.

2. An analogue to digital system for detecting the range of a target at some predetermined distance for use with a continuously emitting radar, comprising:

first and second flip-flops connected to the receiver of said radar, each being responsive to a different voltage level of the signal received by said radar receiver;

said first and second flip-flops having known low triggering voltage thresholds;

pulse counting means operative to start a count responsive to the output of said first flip-flop and to stop said count responsive to the output of said second flip-flop;

trigger means connected to said radar receiver for transforming the pulses of said signal into shaped pulses for input into said counting means; and reckoning logic circuit means connected to the output of said counting means for indicating when the distance between said radar and said target corresponds to said predetermined distance including:

i. analogue means connected to said radar receiver for producing an analogue voltage corresponding to the range of said target, ii. an analogue to digital converter connected to said analogue means to convert said analogue voltage to a digital equivalent, iii. means connected to the output of said counting means to raise the count output to the fourth power, and iv. comparator means operatively connected to said last mentioned means and said converter for comparing their respective outputs to give an output indication corresponding to the distance between said radar and said target.

3. An analogue to digital system for detecting the range of a target at some predetermined distance for use with a continuously emitting radar, comprising:

first and second flip-flops connected to the receiver of said radar, each being responsive to a different voltage level of the signal received by said radar receiver;

said first and second flip-flops having known low triggering voltage thresholds;

pulse counting means operative to start a count responsive to the output of said first flip-flop and to stop said count responsive to the output of said second flip-flop;

trigger means connected to said radar receiver for transforming the pulses of said signal into shaped pulses for input into said counting means; and reckoning logic circuit means responsive to said counting means for indicating when the distance between said radar and said target correspond to said predetermined distance including:

i. a second pulse counting means connected to said trigger means and the one of said flip-flops having the lower threshold for counting the pulses supplied by said trigger means starting the count upon triggering of said last mentioned flip-flop, ii. a comparator connected to said second counting means to receive the output logical count figure from said second counter bit by bit, iii. a binary adder simultaneously responsive to the output count multiplied by a constant coefficient of said first counter and the binary complement of said predetermined range distance measured in numbers of wave lengths of the emitted frequency, and iv. means connecting the output of said binary added to said comparator.

4. In the system of claim 3 wherein the ratio of the low triggering voltages for said first and second flip-flops are determinative of the constant coefficient of the output count of said first counter and further that said ratio is chosen to define said coefficient as a power of 2 so that binary multiplication is achieved through a mere shifting of the binary bits.

* * * * *

UNITED STATES PATENT AND TRADEMARK OFFICE
CERTIFICATE OF CORRECTION

PATENT NO. : 3,908,190
DATED : September 23, 1975
INVENTOR(S) : Guy E. Nathan, Claude A. Varaud It is certified that error appears in the above-identified patent and that said Letters Patent are hereby corrected as shown below:

Delete the title "ANALOGUE TO LOGICAL SYSTEM FOR RANGE MEASUREMENTS INCORPORATING A RADAR" and substitute therefore - - ANALOGUE TO DIGITAL CW RADAR APPARATUS FOR DETECTION OF PREDETERMINED DISTANCES BETWEEN RADAR AND TARGET --.

At column 2, line 67, delete "B," and substitute therefore -- $B_1$ --

Signed and Sealed this twenty-third Day of December 1975

[SEAL]

Attest:

RUTH C. MASON
*Attesting Officer*

C. MARSHALL DANN
*Commissioner of Patents and Trademarks*